United States Patent
Cromer et al.

(10) Patent No.: US 7,417,967 B2
(45) Date of Patent: Aug. 26, 2008

(54) SYSTEM AND METHOD FOR ALLOWING AN ACCESS POINT IN A WIRELESS NETWORK TO OPERATE AT MAXIMUM SPEED

(75) Inventors: Daryl Carvis Cromer, Apex, NC (US); Philip John Jakes, Durham, NC (US); Howard Jeffrey Locker, Cary, NC (US); Raymond Gary Octaviano, II, Raleigh, NC (US)

(73) Assignee: Lenovo (Singapore) Pte Ltd, Singapore (SG)

( * ) Notice: Subject to any disclaimer, the term of this patent is extended or adjusted under 35 U.S.C. 154(b) by 102 days.

(21) Appl. No.: 11/107,990

(22) Filed: Apr. 14, 2005

(65) Prior Publication Data

US 2006/0233134 A1    Oct. 19, 2006

(51) Int. Cl.
*H04Q 7/00*    (2006.01)
(52) U.S. Cl. .................. 370/329; 370/338; 370/401; 455/452.2; 455/41.2
(58) Field of Classification Search .......... 370/310, 370/338, 401, 329; 455/41.2, 67.14, 452.2
See application file for complete search history.

(56) References Cited

U.S. PATENT DOCUMENTS

| | | | |
|---|---|---|---|
| 7,043,252 B2 * | 5/2006 | Khitrik et al. | 455/452.2 |
| 2002/0146024 A1 | 10/2002 | Harris et al. | 370/417 |
| 2002/0184391 A1 | 12/2002 | Phillips | 709/248 |
| 2003/0081628 A1 | 5/2003 | Sugar et al. | 370/461 |
| 2004/0015558 A1 | 1/2004 | Chernoguzov et al. | 709/213 |
| 2004/0136373 A1 | 7/2004 | Bareis | 370/392 |
| 2004/0249953 A1 * | 12/2004 | Fernandez et al. | 709/227 |
| 2005/0036470 A1 * | 2/2005 | Calvert | 370/338 |

* cited by examiner

*Primary Examiner*—Sanh D. Phu
(74) *Attorney, Agent, or Firm*—Sawyer Law Group, LLP

(57) ABSTRACT

A system and method for allowing an access point in a wireless network to operate at maximum speed includes determining if there is at least one client within the network that is operating at less than the maximum speed. If there is, then instruct the at least one client to decrease transmission range until the at least one client is no longer in range of the access point. Then, instruct a client at the maximum speed to interface with the at least one client to provide a peer-to-peer connection wherein the maximum speed client acts as an access point for the at least one client.

5 Claims, 2 Drawing Sheets

SYSTEM AND METHOD FOR ALLOWING AN ACCESS POINT IN A WIRELESS NETWORK TO OPERATE AT MAXIMUM SPEED

FIELD OF THE INVENTION

The present invention relates to wireless networks, and more particularly to a system and method for allowing an access point in a wireless network to operate at maximum speed.

BACKGROUND OF THE INVENTION

New standards continue to improve bandwidth in wireless networks. Typically the increase in bandwidth comes from improved algorithms that can pack more data into the same frequency range. Standard 802.11g has five times the bandwidth of standard 802.11b on the same frequency while standard 802.11n has five times the bandwidth on the same frequency as standard 802.11a.

However, in each of the above examples the old and new standards use the same frequency in the same space, so a client using the old frequency forces other devices within range to back off or revert to the old standard. A single client at the old standard would force clients at the new standard to interface with the network at the old standard, reducing the bandwidth in the wireless network.

BRIEF SUMMARY OF THE INVENTION

A system and method for allowing an access point in a wireless network to operate at maximum speed includes determining if there is at least one client within the network that is operating at less than the maximum speed. If there is, then instruct the at least one client to decrease transmission range until the at least one client is no longer in range of the access point. Then, instruct a client at the maximum speed to interface with the at least one client to provide a peer-to-peer connection wherein the maximum speed client acts as an access point for the at least one client.

According to a method and system disclosed herein, the present invention removes the client at a lower rate from forcing the access point to slow the entire network down. Rather, the transmission of the client at a lower rate is reduced until it is no longer received by the access point and one of the other clients will interface with the lower client and serve as a pseudo access point, interfacing with that one client in a peer-to-peer mode, for example, and re-routing traffic from the lower client to the access point, but at the higher rate (for example, from the new standard).

DETAILED DESCRIPTION OF THE INVENTION

The present invention relates to a system and method for allowing an access point in a wireless network to operate at maximum speed. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
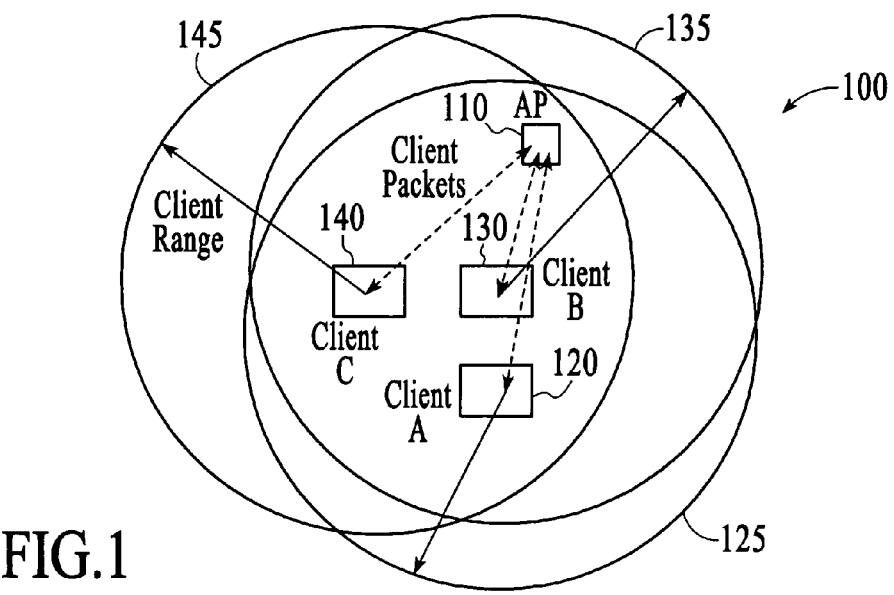
FIG. 1 is a diagram of a wireless network.

FIG. 1 is a diagram of a wireless network 100. An access point 110, for example a wireless router, that provides access to the network 100 for clients 120, 130, and 140. The client 120 may be operating at standard 802.11a or 802.11b, and has a range with a transmitter (not shown) to an outer limit 125, which encompasses the access point 110.

The client 130 may be operating at standard 802.11n, and has a range with a transmitter (not shown) to an outer limit 135, which encompasses access point 110. The client 140 may be operating at standard 802.11g, and has a range with a transmitter (not shown) to an outer limit 145, which encompasses access point 110.

Each of clients 120, 130 and 140 are sending to and receiving data packets from the access point 110. Without the presence of client 120, clients 130 and 140 are able to communicate with the access point 110 at a higher rater. However, because client 120 is part of the network 100, all the clients 120, 130 and 140 must communicate at the lower rate of client 120, decreasing the bandwidth of wireless network 100.

Figure 2:
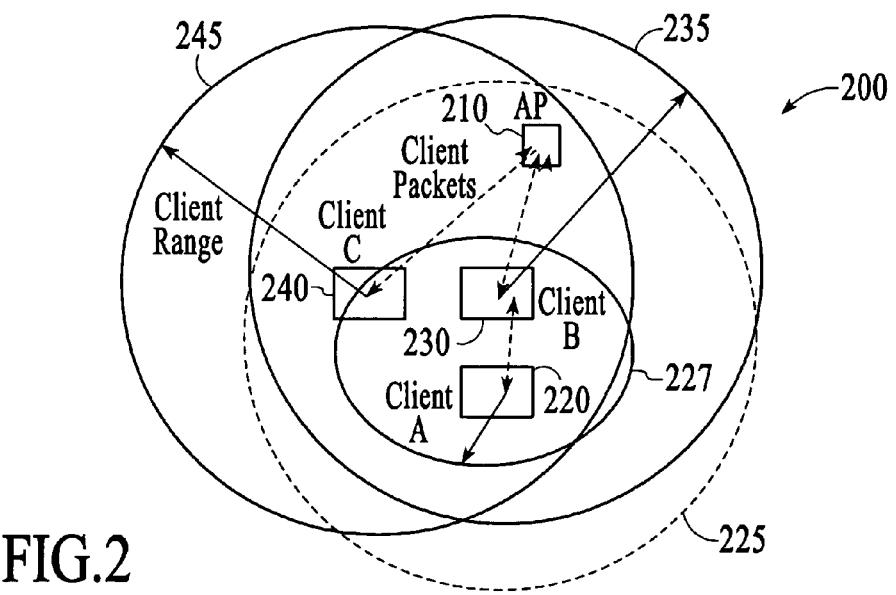
FIG. 2 is a diagram of one embodiment of the invention implemented in a wireless network.

FIG. 2 is a diagram of one embodiment of the invention implemented in a wireless network 200. FIG. 2 includes an access point 210, for example a wireless router, that provides access to the network 200 for clients 220, 230, and 240. The client 220 may be operating at standard 802.11a or 802.11b, and has a range sufficient to contact the access point 210.

Figure 3:
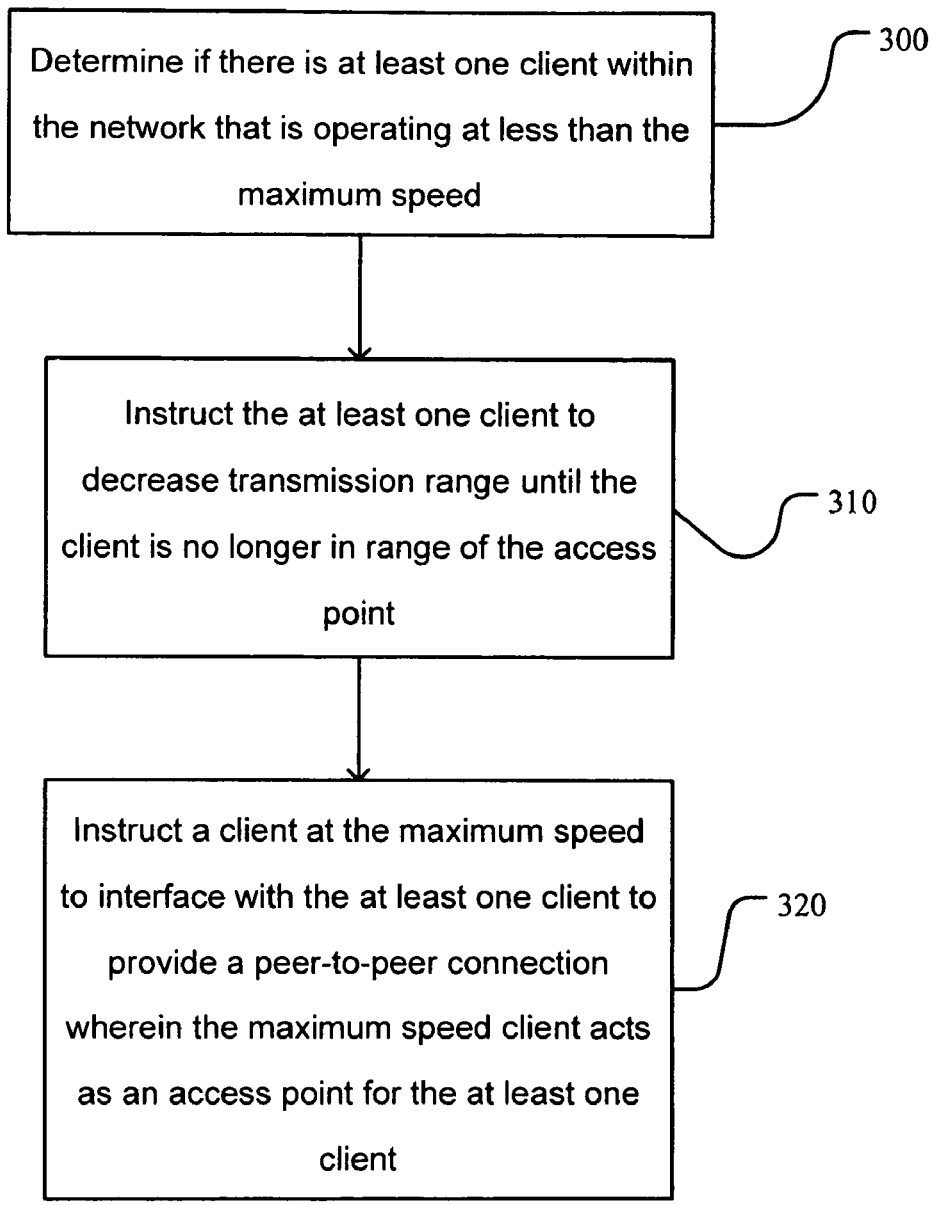
FIG. 3 is a flow diagram illustrating one method of implementing the invention in the wireless network of FIG. 2.

FIG. 3 is a flow diagram illustrating one method of implementing the invention in the wireless network 200 of FIG. 2. FIGS. 2 and 3 will be discussed together. In block 300, the access point 210 determines if there is at least one client within the network 200 that is operating at less than the maximum speed of the network 200. In one example, the client 220 is communicating with the access point 210, which is in range of the outer limits 227 of the client's 220 transmission range, with the lower standard of 802.11a. The clients 230 and 240 are communicating with the access point 210 at the higher rate of standard 802.11n, which in this example is the maximum speed of the network. The client 230 has a range to an outer limit 235, while the client 240 has a range to an outer limit 245.

In block 310, access point 210 instructs client 220 to decrease transmission range until the client is no longer in range of the access point 210. In one embodiment, decreasing transmission range is accomplished by decreasing power to a transmitter (not shown). The range of the client 220 at a decreased transmission range is now the outer limit 227, which encompasses the client 230 fully, the client 240 partially, and the access point 210 not at all.

Incremental decreases in power or range may be applied until the access point 210 is out of range.

In one embodiment, the access point 210 may instruct the client 220 to transmit a beacon in a lower frequency. In block 320, the access point 210 instructs a client at the maximum speed, for example client 230, to interface with the client 220, which is at a lower rate established by standard 802.11a. Client 230 is instructed to provide a peer-to-peer connection wherein the client 230 acts as an access point for the client 220. Clients 220 and 230 may enter a peer-to-peer mode in an unused channel to avoid collisions with active packet traffic.

If no other client is in range after the access point 210 is out of range, then the client 220 is likely closest to access point 210. After some period of time without contact from another client, client 220 may revert back to full power and communicate with access point 210 normally.

The access point 210 may send packets, or traffic, to client 220 through client 230. Client 220 communicates with client 230 at the lower rater dictated by standard 802.11a. Client 230 serves as a proxy or pseudo server to direct the traffic from client 220 to access point 210 and vice-versa, but at the higher rate dictated by standard 802.11n. Clients 230 and 240 both communicate with access point 210 at the higher rate dictated by standard 802.11n and bandwidth is therefore preserved in the wireless network 200, with clients 220, 230 and 240 all able to access the network 200. Client 230 may switch back and forth from serving its bandwidth needs to serving those of client 220.

According to the method and system disclosed herein, the present invention provides a system and method for allowing an access point in a wireless network to operate at maximum speed. One skilled in the art will recognize that the particular standards used are exemplary, and any bandwidth-limited network may apply the invention in the above manner. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method, in a first client device, for maintaining bandwidth in a wireless network, the method comprising:
communicating with an access point in the wireless network; halting direct communication with the access point, wherein the halting direct communication with the access point decreasing transmission range until the access point is no longer in range, wherein a second client device is still in range of the first client device; and
communicating with the access point through the second client in the wireless network, the second client communicating at a higher rate than the first client.

2. The method of claim 1, decreasing transmission range until the access point is no longer in range further comprising:
decreasing power to a transmitter in the first client device.

3. The method of claim 1 further comprising:
transmitting a beacon in a lower frequency.

4. The method of claim 1, communicating with the access point through a second client in the wireless network further comprising:
entering a peer-to-peer mode with the second client.

5. A system comprising:
an access point for communicating with a first client in a wireless network, for determining if the first client within the wireless network that is operating at less than the maximum speed, for instructing the first client to halt direct communication with the access point by decreasing transmission range until the first client is no longer in range of the access point, wherein the a second client device is still in range of the first client device, for communicating with the second client in the wireless network, the second client communicating at a higher rate than the first client and for instructing the second client to interface with the first client to provide a peer-to-peer connection, wherein the first client communicates with the access point through the second client, and wherein the second client acts as an access point for the first client.

* * * * *